(12) United States Patent
Lee et al.

(10) Patent No.: US 10,564,453 B2
(45) Date of Patent: Feb. 18, 2020

(54) DISPLAY DEVICE

(71) Applicant: SAMSUNG DISPLAY CO., LTD., Yongin-si, Gyeonggi-do (KR)

(72) Inventors: Cheolse Lee, Suwon-si (KR); Jiwon Lee, Suwon-si (KR); Hyunsu Park, Hwaseong-si (KR); Juyoung Yoon, Seoul (KR); Sunghun Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 17 days.

(21) Appl. No.: 15/664,121

(22) Filed: Jul. 31, 2017

(65) Prior Publication Data

US 2018/0039128 A1 Feb. 8, 2018

(30) Foreign Application Priority Data

Aug. 4, 2016 (KR) ........................ 10-2016-0099430

(51) Int. Cl.
*G02F 1/1333* (2006.01)
*F21V 8/00* (2006.01)

(52) U.S. Cl.
CPC ........ *G02F 1/133308* (2013.01); *G02B 6/005* (2013.01); *G02F 2001/13332* (2013.01); *G02F 2001/133314* (2013.01); *G02F 2001/133317* (2013.01)

(58) Field of Classification Search
USPC .......................................................... 362/606
See application file for complete search history.

(56) References Cited

U.S. PATENT DOCUMENTS

| 2007/0116948 A1 | 5/2007 | Kim et al. | |
| 2012/0050201 A1* | 3/2012 | Nozawa | G06F 3/045 345/173 |
| 2016/0018692 A1 | 1/2016 | Park | |
| 2016/0054612 A1 | 2/2016 | Hao et al. | |

FOREIGN PATENT DOCUMENTS

| JP | 2012118184 A | 6/2012 |
| KR | 100721702 B1 | 5/2007 |
| KR | 101204906 A | 11/2012 |
| KR | 1020150033785 A | 4/2015 |
| KR | 1020160011573 A | 2/2016 |

* cited by examiner

*Primary Examiner* — Matthew Mikels
(74) *Attorney, Agent, or Firm* — Cantor Colburn LLP

(57) ABSTRACT

A display device includes: a display panel which displays an image with light; a support frame on which the display panel is supported, the support frame including a support portion which supports the display panel thereon, and a side surface portion extended bent from the support portion; an auxiliary sheet between the display panel and the support portion, the auxiliary sheet fastened to the display panel and to the support frame; and a first adhesive member between the auxiliary sheet and the support portion, the first adhesive member attaching the auxiliary sheet to the support portion. The auxiliary sheet includes a same material as a material included in the support frame.

12 Claims, 3 Drawing Sheets

DISPLAY DEVICE

This application claims priority to Korean Patent Application No. 10-2016-0099430, filed on Aug. 4, 2016, and all the benefits accruing therefrom under 35 U.S.C. § 119, the content of which in its entirety is herein incorporated by reference.

BACKGROUND

1. Field

Embodiments of the invention relate to a display device.

2. Description of the Related Art

Liquid crystal display ("LCD") devices, which are one of the most widely used flat panel display ("FPD") devices, include two substrates on which electrodes are formed and a liquid crystal layer interposed therebetween. The LCD device is a display device that may adjust an amount of light transmitted therethrough by applying voltage to two electrodes to rearrange liquid crystal molecules of the liquid crystal layer and display an image.

The display device includes a display panel and a support frame which supports and fastens the display panel within the display device. In order to reduce an overall thickness of the display device, the display panel is directly attached to the support frame using a coupling member such as an adhesive member. For example, a double-sided tape having a quadrangular loop shape may be used for attaching a rear edge of the display panel on the support frame.

SUMMARY

Exemplary embodiments of the invention may be directed to a display device capable of reducing or substantially preventing detachment of a display panel from a support frame.

According to an exemplary embodiment, a display device includes: a display panel which displays an image with light; a support frame on which the display panel is supported, the support frame including a support portion which supports the display panel and a side surface portion extended bent from the support portion; an auxiliary sheet between the display panel and the support portion, the auxiliary sheet fastened to the display panel and the support portion; and a first adhesive member between the auxiliary sheet and the support portion, the first adhesive member attaching the auxiliary sheet to the support portion. The auxiliary sheet includes a same material as a material included in the support frame.

The support frame and the auxiliary sheet may include at least one selected from magnesium (Mg), aluminum (Al) and alloys thereof.

The first adhesive member between the auxiliary sheet and the support portion may be a double-sided tape.

At least one surface of the first adhesive member between the auxiliary sheet and the support portion may include at least one selected from an acrylic resin, an epoxy resin, a fluoro-resin and a polytetrafluoroethylene resin.

The display device may further include a second adhesive member between the display panel and the auxiliary sheet, the second adhesive member attaching the display panel to the auxiliary sheet.

The second adhesive member between the display panel and the auxiliary sheet may have a greater adhesive force than an adhesive force of the first adhesive member between the auxiliary sheet and the support portion.

The first adhesive member between the auxiliary sheet and the support portion may have an adhesive force in a range from about 1 kilogram-force per square centimeter ($kgf/cm^2$) to about 10 $kgf/cm^2$ and the second adhesive member between the display panel and the auxiliary sheet has an adhesive force in a range from about 30 $kgf/cm^2$ to about 500 $kgf/cm^2$.

The second adhesive member between the display panel and the auxiliary sheet may include at least one selected from an acrylic resin, an epoxy resin, a fluoro-resin and a polytetrafluoroethylene resin.

The side surface portion of the support frame may extend to further include a bottom portion of the support frame extending to be disposed under the display panel.

The display device may further include: a light source which generates and emits the light, the light source disposed between the bottom portion and the support portion; a light guide plate to which the light source provides the light, the light guide plate emitting the light provided from the light source toward the display panel; and an optical sheet between the light guide plate and the display panel.

The display device may further include: a lower frame coupled to the support frame.

The display device may further include: a light source which generates and emits the light, the light source disposed in the lower frame; a light guide plate to which the light source provides the light, the light guide plate emitting the light provided from the light source toward the display panel; and an optical sheet between the light guide plate and the display panel.

The foregoing is illustrative only and is not intended to be in any way limiting. In addition to the illustrative exemplary embodiments and features described above, further aspects, exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, where.

DETAILED DESCRIPTION

Figure 1:
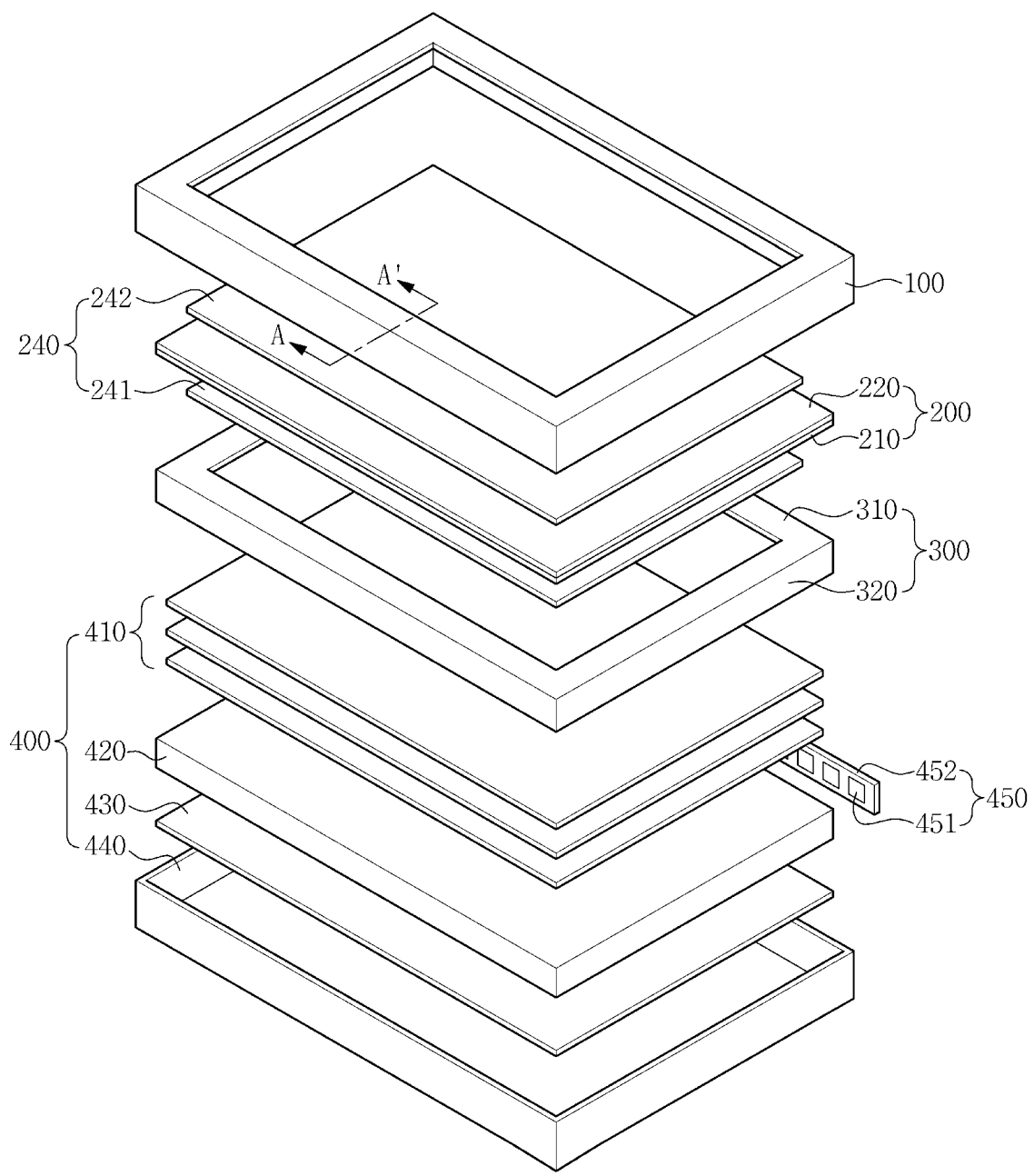
FIG. 1 is an exploded perspective view schematically illustrating an exemplary embodiment of a display device according to the invention.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

When a layer, area or plate is referred to as being related to another element such as being "on" another layer, area, or plate, it may be directly on the other layer, area or plate with no intervening layers, areas or plates present therebetween, or intervening layers, areas or plates may be present therebetween. Conversely, when a layer, area or plate is referred to as being related to another element such as being "directly on" another layer, area or plate, intervening layers, areas or plates are absent therebetween. Further when a layer, area or plate is referred to as being related to another element such as being "below" another layer, area or plate, it may be directly below the other layer, area or plate with no intervening layers, areas or plates present therebetween, or intervening layers, areas, or plates may be present therebetween. Conversely, when a layer, area or plate is referred to as being related to another element such as being "directly below" another layer, area or plate, intervening layers, areas or plates are absent therebetween.

The spatially relative terms "below," "beneath," "less," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element may be "physically connected" to the other element, or may be "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe exemplary embodiments of the invention and like reference numerals refer to like elements throughout the specification.

In a case where a display device including a display panel and a support frame which supports the display panel is exposed to a relatively high-temperature and high-humidity environment, stress due to a difference in thermal strain rate between the display panel and the support frame is generated. This stress generation may cause deformation or damage to a coupling member coupling the display panel and the support frame to each other. For example, where the coupling member includes an adhesive tape, such adhesive member may peel off from the display panel and/or the support frame from the stress generation. Accordingly, the adhesive force between the display panel and the support frame is reduced and the display panel may be undesirably detached from the support frame. Therefore, a structure in which the display panel is reliably fixed to the support frame within the display device is desired.

Hereinafter, an exemplary embodiment of a display device according to the invention will be described with reference to FIGS. 1 and 2.

Figure 2:
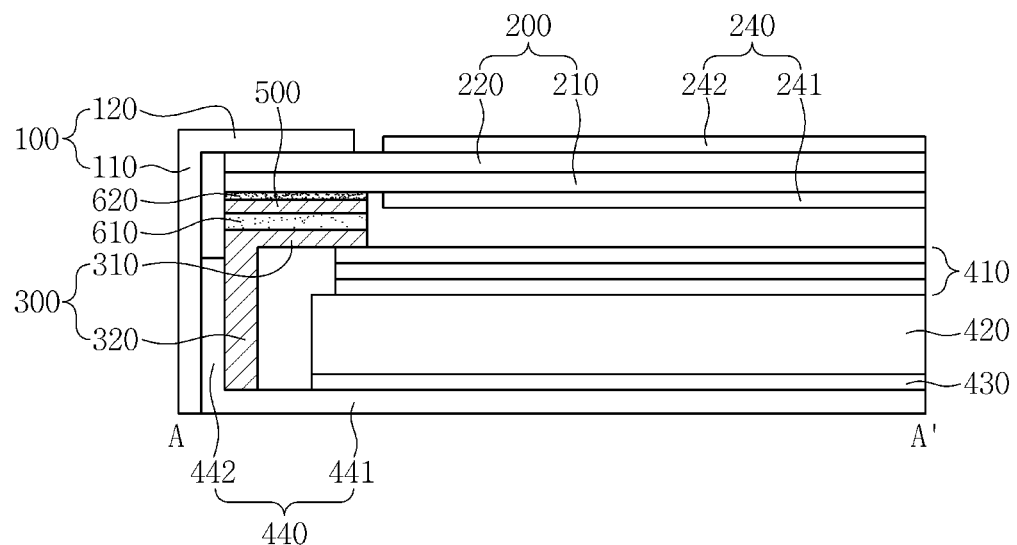
FIG. 2 is a cross-sectional view of the display device taken along line A-A' of FIG. 1.

FIG. 1 is an exploded perspective view schematically illustrating an exemplary embodiment of a display device according to the invention and FIG. 2 is a cross-sectional view of the display device taken along line A-A' of FIG. 1.

Referring to FIGS. 1 and 2, the display device includes a display panel 200 generating and displaying an image with light, a backlight assembly 400 providing the light to the display panel 200, and a support frame 300 on which an upper frame 100 and the display panel 200 are mounted.

The upper frame 100 is coupled to a lower frame 440 to cover an edge of the display panel 200 mounted on the support frame 300. The upper frame 100 includes an edge portion 110 coupled to the lower frame 440 and a protrusion (portion) 120 which is bent and extends from the edge portion 110. The upper frame 100 fastens an upper edge of the display panel 200 within the display device to reduce or substantially prevent the display panel 200 from being detached from the backlight assembly 400.

The edge of the display panel 200 covered by the upper frame 100 is a non-display area. The upper frame 100 includes an open window at a center portion thereof through which the display panel 200 is exposed.

The upper frame 100 may be coupled to the lower frame 440 using a coupling member such as a hook and/or a screw, but the invention is not limited thereto. In addition, the coupling of the upper frame 100 and the lower frame 440 to each other may be modified in various forms.

The upper frame 100 may include a metal material having rigidity such as steel, or a material having relatively good heat dissipation characteristics such as aluminum or an aluminum alloy. In an exemplary embodiment of a method of manufacturing a display device, the upper frame 100 may be formed by a press molding process or the like to have a predetermined curvature.

The display panel 200 displays an image with light. The display panel 200 may be a light receiving display panel, such as a liquid crystal display ("LCD") panel, an electrowetting display panel, an electrophoretic display panel, a microelectromechanical system ("MEMS") display panel and the like. In an exemplary embodiment, an LCD panel will be described as an example. Further, although not illustrated, the display panel 200 may be a flexible panel that may be bent at least in one direction.

The display panel 200 may be provided in a quadrangular plate shape having two pairs of sides parallel to each other. The display panel 200 according to an exemplary embodiment may be a rectangle having a pair of long sides and a pair of short sides. In a top plan view, the relatively long sides each extend in a first direction and the relatively short sides each extend in a second direction which crosses the first direction. A thickness direction of the display device defines a third direction which crosses both the first and second directions. FIG. 2, for example, is a view of the thickness direction of the display device, in a plane defined by the second and third directions, where the first (long) dimension extends into the page view.

The display panel 200 includes a first (display) substrate 210, a second (display) substrate 220 opposing the first substrate 210 and an optical control or transmittance layer such as a liquid crystal layer (not illustrated) between the first substrate 210 and the second substrate 220.

The display panel 200, on a plane, includes a display area at which an image is displayed and a non-display area which surrounds the display area and at which the image is not displayed. The non-display area is covered by the upper frame 100. The open window of the upper frame 100 may correspond to the display area of the display panel 200 and expose the display area to outside the display device such that the image is visible from outside the display device.

The first substrate 210 may include a pixel electrode provided in plurality (not illustrated) and a thin film transistor provided in plurality (not illustrated) respectively electrically connected with the pixel electrodes. The above-described elements of the first substrate 210 may be disposed on a first base substrate thereof. A conductive signal line such as a data line is connected to a source electrode of the thin film transistor, a conductive signal line such as a gate line is connected to a gate electrode of the thin film transistor, and the pixel electrode is connected to a drain electrode of the thin film transistor. Each thin film transistor switches a driving signal to control the driving signal provided to each corresponding one of the pixel electrodes.

The second (display) substrate 220 includes a common electrode (not illustrated) which forms an electric field for controlling the arrangement of liquid crystals of the liquid crystal layer together with the pixel electrodes. In addition, the second substrate 220 may further include a color filter (not illustrated). The color filter may include red, green and blue color filters. The above-described elements of the second substrate 220 may be disposed on a second base substrate thereof, but the invention is not limited thereto.

The liquid crystal layer (not illustrated) as the optical control or transmittance layer is interposed between the first substrate 210 and the second substrate 220, and molecules or particles thereof are rearranged by an electric field formed between the pixel electrodes and the common electrode. As such, the rearranged liquid crystal layer adjusts the transmittance of light emitted from the backlight assembly 400, and the adjusted light passes through the color filter to display an image to the outside.

A driving circuit board (not illustrated) may be disposed on at least one side of the display panel 200. The driving circuit board may apply the driving signal to various signal lines disposed in the first substrate 210. The driving circuit board includes a gate driving circuit board applying a scan signal to the gate line and/or a data driving circuit board applying a data signal to the data line described above.

The display panel 200 and the driving circuit board are electrically connected to each other such as by at least one flexible printed circuit board (not illustrated). A first end of the flexible printed circuit board overlaps a portion of the first substrate 210 to be electrically connected thereto, and an end of the flexible printed circuit board opposite to the first end thereof overlaps a portion of the driving circuit board to be electrically connected thereto. The flexible printed circuit board may be a chip on film ("COF") or a tape carrier package ("TCP"). The number of the flexible printed circuit boards may have various values depending on the size of the display panel and/or the driving method of the display device.

A driving chip (not illustrated) may be mounted on the flexible printed circuit board. The driving chip may generate various driving signals for driving the display panel 200. The driving chip may be represented by a driver integrated circuit ("IC") or a source IC in which a timing controller and/or a data driving circuit are integrated into one chip.

The flexible printed circuit board attached to one side of the display panel 200 is bent along a side wall portion 442 of the lower frame 440 to be described below, and the driving circuit board may be disposed at the side wall portion 442 of the lower frame 440 or at a rear edge of a bottom portion 441 of the lower frame 440.

A collective polarization plate (member) 240 is disposed on the display panel 200 and includes a first polarization plate 241 and a second polarization plate 242. The first polarization plate 241 and the second polarization plate 242 are disposed on surfaces of the first substrate 210 and the second substrate 220 that are opposite to surfaces of the first substrate 210 and the second substrate 220 facing each other, respectively. That is, the first polarization plate 241 may be attached to an outer side (surface) of the first substrate 210 and the second polarization plate 242 may be attached to an outer side (surface) of the second substrate 220.

A transmission axis of the first polarization plate 241 is substantially perpendicular to a transmission axis of the second polarization plate 242. The first polarization plate 241 may pass only specific polarized light among light output from the backlight assembly 400 and may absorb or block remaining light. The second polarization plate 241 may pass only specific polarized light among light externally incident thereto and may absorb or block remaining light.

The support frame 300 is coupled to the lower frame 440 and supports the display panel 200. The support frame 300 is provided along an edge of the display panel 200 to support the display panel 200 from a lower portion of the display panel 200. The support frame 300 may be provided at a position corresponding to four sides of the display panel 200, or at a position corresponding to at least a portion of the four sides. In an exemplary embodiment, for example, the support frame 300 may have a quadrangular loop shape corresponding to the four sides of the display panel 200, such as at the non-display area thereof.

As illustrated in FIG. 2, the support frame 300 includes a collective support portion 310 on which the display panel 200 is supported and a collective side surface portion 320 which is bent from the support portion 310. The support portion 310 and/or the side surface portion 320 may be formed by individual portions lengthwise extended in the first or second directions in the top plan view. The support portion 310 is fixed to the display panel 200 at the non-display area thereof.

In a cross-sectional view, a length of the side surface portion 320 according to an exemplary embodiment is larger than a length of the side wall portion 442 of the lower frame 440 to be described below. One of the support portion 310 and the side surface portion 320 may be extended to define the other one of the support portion 310 and the side surface portion 320, such that the support frame 300 is an integral member. However, the invention is not limited thereto.

The support frame 300 may include a flexible material such as a plastic material to reduce or substantially prevent damage or breakage of the display panel 200. In addition, the support frame 300 may include a metal material to secure the fastening force with the lower frame 440 and rigidity thereof. In the case where the support frame 300 includes a metal material, the side surface portion 320 may have a thickness ranging from about 0.1 millimeter (mm) to about 0.3 mm so as to allow portions of the support frame 300 to be bent. However, exemplary embodiments are not limited thereto, and the thickness of the side surface portion 320 may be variously set so that both the ductility and rigidity of the side surface portion 320 may be secured. Referring to FIG. 2, for example, the thickness of the side surface portion 320 is taken in the (second) direction along A-A', while the thickness of the support portion 310 is taken in the (third) thickness direction of the display device.

In an exemplary embodiment, with the upper frame 100 surrounding the lower frame 440 and the support frame 300 at outsides thereof, the fastening force of the display panel 200, the support frame 300 and the backlight assembly 400 relative to each other is secured. That is, the upper frame 100 is arranged so that an inner side surface of the edge portion 110 contacts an outer side surface of the side wall portion 442 of the lower frame 440.

The backlight assembly 400 includes an optical sheet (member) 410, a light guide plate 420, a reflective sheet 430, the lower frame 440 and a light source unit 450.

The light source unit 450 includes a light source 451 which generates and emits light, and a circuit board 452 on which the light source 451 is disposed. The light source 451 may be disposed at an edge portion or an incident side surface of the light guide plate 420. The light source 451 may be provided in plurality on the circuit board 452 and/or at the light incident surface of the light guide plate 420. That is, the light source unit 450 may generate light and emit the light to the edge portion or the incident side surface of the light guide plate 420.

The light source 451 may include at least one LED chip (not illustrated) and a package (not illustrated) for accommodating the LED chip. The light source 451 may have an emission surface facing in a direction in which the light guide plate 420 is disposed. The light generated and emitted from the light source 451 may be blue light.

The circuit board 452 includes, for example, a printed circuit board ("PCB") or a metal printed circuit board ("metal PCB").

The light source unit 450 may be disposed at only one side, each of opposing sides or all four sides of the light guide plate 420. That is, the light source unit 450 may be disposed relative to at least one of the edge portions of the light guide plate 420 in consideration of the size, luminance uniformity, and the like of the display panel 200.

Although not illustrated, a heat dissipation member (not illustrated) may be disposed between the light source unit 450 and the lower frame 440. The heat dissipation member dissipates heat generated in the light source unit 450 to outside the backlight assembly 400 and/or the display device. In the case where the light source unit 450 is arranged in a bar or line shape at one side surface of the lower frame 440, the heat dissipation member may also be arranged as a metal frame having a bar or line shape at the same one side surface. As described above, the heat dissipation member may have various shapes depending on the shape and location of the light source unit 450.

The light guide plate 420 receives the light emitted from the light source 451 at the incident side surface and emits the light to the emission surface of the light guide plate 420. The emission surface faces the display panel 200. The light guide plate 420 uniformly supplies the light provided from the light source unit 450 to the display panel 200. The light guide plate 420 is disposed in the vicinity of the light source unit 450 and accommodated in the lower frame 440.

The light guide plate 420 may be formed in a quadrangular plate similar to the display panel 200, for example. The light guide plate 420 includes an emission surface through which light is emitted from the light guide plate 420, a rear surface opposite to the emission surface, and side surfaces each connecting the emission and rear surfaces to each other. One or more the side surfaces defines the (light) incident side surface of the light guide plate 420. However, exemplary embodiments are not limited thereto. In the case where the light source 451 such as a light emitting diode ("LED") is used, the light guide plate 420 may include a predetermined groove or protrusion shape depending on the position of the light source 451.

Although the light guide plate 420 has been described as a plate having a relatively large cross-sectional thickness for ease of description, for convenience of explanation, the invention is not limited thereto. According to exemplary embodiments, the light guide plate 420 may be provided in a sheet or film shape for which the cross-sectional thickness is smaller than that of the plate and is relatively small as compared to the planar size thereof, to achieve slimness of the display device. The light guide plate 420 is to be understood as having a concept that includes not only a plate but also a film which guides for guiding light provided from the light source unit 450.

The light guide plate 420 may include a light transmitting material such as an acrylic resin, e.g., polymethylmethacrylate ("PMMA"), and polycarbonate ("PC"), to allow light to be efficiently guided.

A pattern may be disposed formed on at least one surface of the light guide plate 420. In an exemplary embodiment, for example, a scattering pattern (not illustrated) may be disposed at the rear surface of the light guide plate 420 so that light guided to the rear surface may be emitted upward towards the emission surface.

Although not illustrated, a wavelength converter (not illustrated) may be disposed between the light guide plate 420 and the light source unit 450. The wavelength converter may include a material that changes the wavelength of light provided from the light guide unit 450. In an exemplary embodiment, for example, the wavelength converter may convert a wavelength of a blue light emitted from a blue LED light source into a white light.

The collective optical sheet 410 is disposed above the light guide plate 420 and diffuses and collimates light guided thereto from the light guide plate 420, to change a path of such light. The optical sheet 410 may include a collection of individual sheets such as a diffusion sheet, a prism sheet and a protective sheet.

The diffusion sheet diffuses light guided from the light guide plate 420 so as to reduce or substantially prevent the light from being partially concentrated.

The prism sheet may include prisms having a triangular cross-section formed on a surface thereof in a predetermined arrangement. The prism sheet may be disposed on the diffusion sheet and serve to collimate the light diffused by the diffusion sheet in a direction perpendicular to the display panel 200.

The protective sheet may be disposed on the prism sheet and serve to protect a surface of the prism sheet and diffuse light to achieve uniform light distribution.

The reflective sheet 430 is disposed between the light guide plate 420 and the lower frame 440. The reflective sheet 430 reflects the light guided downwards from the light guide plate 420 to be redirected toward the display panel 200, thus improving luminous efficiency.

The reflective sheet 430 may include, for example, polyethylene terephthalate ("PET"), thus having reflective characteristics. One surface of the reflective sheet 430 may be coated with a diffusion layer including, for example, titanium dioxide.

In an exemplary embodiment, the reflective sheet 430 may include a material including a metal such as silver (Ag).

The lower frame 440 accommodates therein the reflective sheet 430 and the light guide plate 420. The lower frame 440 includes the bottom portion 441 and the side wall portion 442 bent from the bottom portion 441. The bottom portion 441 of the lower frame 440 is parallel to the light guide plate 420. The lower frame 440 may include a relatively rigid metal material such as stainless steel or a material having good heat dissipation properties such as aluminum or an aluminum alloy. The lower frame 440 according to an exemplary embodiment maintains the overall framework of the display device and protects various components accommodated therein.

The display device according to an exemplary embodiment includes an auxiliary sheet 500, a first (coupling) adhesive member 610 and a second (coupling) adhesive member 620 between the support frame 300 and the display panel 200 so as to improve the adhesion between the support frame 300 and the display panel 200. Each of the auxiliary sheet 500, the first adhesive member 610 and the second adhesive member 620 may have a quadrangular loop shape corresponding to the four sides of the display panel 200, similar to that defined by the support frame 300. The auxiliary sheet 500, the first adhesive member 610 and the second adhesive member 620 along with the support frame 300 may defined a stacked frame structure for the display panel 200.

The auxiliary sheet 500 includes a substantially same material as that included in the support frame 300. As including the same material, a collective "support member" may hereinafter be a collection of the auxiliary sheet (portion) 500 and the support frame (portion) 300. Such collection may further include an adhesive member respectively between the auxiliary sheet (portion) 500 and the support frame (portion) 300. The auxiliary sheet portion 500 of the collective support member may be a separate (e.g., disconnected) member from the support from portion 300 thereof.

In an exemplary embodiment, for example, in the case where the support frame 300 includes a plastic material to reduce or effectively prevent breakage of the display panel 200, the auxiliary sheet 500 may include a substantially same plastic material as that included in the support frame 300. In the case where the support frame 300 includes a metal material to secure the fastening force with the lower frame 440 and rigidity thereof, the auxiliary sheet 500 may include a substantially same metal material as that included in the support frame 300.

The auxiliary sheet (member) 500 is fixed to the display panel 200 by the second adhesive member 620 to be described below. That is, the auxiliary sheet 500 may be attached to an outer edge of the first substrate 210 in the top plan view, by the second adhesive member 620.

The first adhesive member 610 is disposed on an upper surface of the support portion 310 of the support frame 300 and fixes the display panel 200 on the support frame 300. That is, a first surface of the first adhesive member 610 is attached to the support frame 300 and a second surface of the first adhesive member 610 opposing the first surface thereof is attached to the auxiliary sheet 500.

In such an exemplary embodiment, since the support frame 300 and the auxiliary sheet 500 attached by the first adhesive member 610 include a substantially same material, occurrence of the stress due to a difference in thermal strain between the support frame 300 and the auxiliary sheet 500 may be reduced or substantially prevented. As such, separation of the first adhesive member 610 from the support frame 300 and the auxiliary sheet 500 may be reduced or effectively prevented, and adhesion of the support frame 300 to the auxiliary sheet 500 may be improved. In addition, since the stress generated between the support frame 300 and the auxiliary sheet 500 is reduced, an overall thickness of the first adhesive member 610 may be reduced to reduce an overall thickness of the display device.

The first adhesive member 610 according to an exemplary embodiment may be a double-sided tape. In such an exemplary embodiment, at least one surface of the double-sided tape may include at least one selected from an acrylic resin, an epoxy resin, a fluoro-resin and a polytetrafluoroethylene ("PTFE") resin such as a Teflon™ resin.

The second adhesive member 620 is disposed on an outer edge of the first substrate 210 of the display panel 200 in the top plan view, and fixes the auxiliary sheet 500 to the display panel 200. In such an exemplary embodiment, the second adhesive member 620 has an adhesive force larger than that of the first adhesive member 610. The adhesive forces may be defined relative to the auxiliary sheet 500 common to the first and second adhesive members 610 and 620, but the invention is not limited thereto.

In an exemplary embodiment, for example, the adhesive force of the first adhesive member 610 may be in a range from about 1 kilogram-force per square centimeter (kgf/cm$^2$) to about 10 kgf/cm$^2$, and the adhesive force of the second adhesive member 620 may be in a range from about 30 kgf/cm$^2$ to about 500 kgf/cm$^2$. Accordingly, the auxiliary sheet 500 may be firmly fixed to the display panel 200 by the second adhesive member 620.

The second adhesive member 620 according to an exemplary embodiment may be a liquid adhesive. In an exemplary embodiment of a method of manufacturing a display device, for example, the auxiliary sheet 500 may be disposed on the first substrate 210 over which the liquid adhesive has been disposed or coated, and the liquid adhesive between the auxiliary sheet 500 and the first substrate 210 is cured such that the auxiliary sheet 500 may be fixed to the display panel 200. The second adhesive member 620 may include at least one selected from an acrylic resin, an epoxy resin, a fluororesin and a polytetrafluoroethylene ("PTFE") resin such as a Teflon™ resin.

The display device according to an exemplary embodiment is configured such that a support member (e.g., 500 together with 300) fixes the display panel 200 in the display device, where the support frame 300 and the display panel 200 are coupled to each other using the auxiliary sheet 500, the first adhesive member 610 and the second adhesive member 620, thus improving the overall adhesion between the display panel 200 and the support frame 300. Accordingly, the display panel 200 is firmly fixed on the support frame 300 and thus detachment of the display panel 200 from the support frame 300 may be reduced or substantially prevented.

In addition, although not illustrated, a third adhesive member (not illustrated) may be disposed between the side surface portion 320 and the side wall portion 442 to secure the fixing force between the support frame 300 and the lower frame 440. The third adhesive member may be a double-sided tape.

Figure 3:
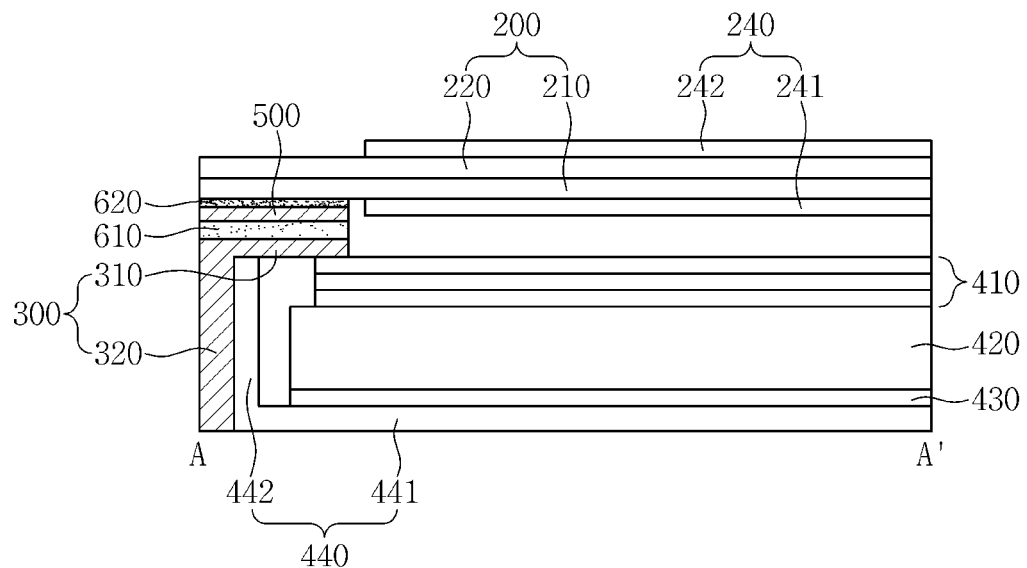
FIG. 3 is a cross-sectional view of another exemplary embodiment of a display device according to the invention, taken along line A-A' of FIG. 1.

FIG. 3 is a cross-sectional view of another exemplary embodiment of a display device according to the invention, taken along line A-A' of FIG. 1. The descriptions of the same configuration as an exemplary embodiment will be omitted for convenience of explanation.

Referring to FIG. 3, the display device according to an alternative exemplary embodiment does not include an upper frame 100. The fastening force between a display panel 200, a support frame 300 and a backlight assembly 400 may be reduced by omitting the upper frame 100 of the display device. In order to reduce or substantially prevent degradation of the fastening force of the display panel 200, the support frame 300 and the backlight assembly 400 relative to each other, the support frame 300 according to an alternative exemplary embodiment is disposed to surround a lower frame 440 at an outside thereof. That is, the support frame 300 is arranged so that an inner side surface of a side surface portion 320 of the support frame 300 contacts an outer side surface of a side wall portion 442 of the lower frame 440.

In addition, although not illustrated, a third adhesive member (not illustrated) may be disposed between the side surface portion 320 and the side wall portion 442 to secure the fastening force between the support frame 300 and the lower frame 440. The third adhesive member may be a double-sided tape.

The support frame 300 according to an alternative exemplary embodiment includes a metal material to secure the fastening force with the lower frame 440 and rigidity thereof. In such an exemplary embodiment, since an auxiliary sheet 500 includes a substantially same material as that included in the support frame 300, the auxiliary sheet 500 includes a substantially same metal as that included in the support frame 300. In an exemplary embodiment, for example, the support frame 300 and the auxiliary sheet 500 may include at least one selected from magnesium (Mg), aluminum (Al) and alloys thereof.

Since the support frame 300 and the auxiliary sheet 500 attached by a first adhesive member 610 include a substantially same material, occurrence of stress due to the difference in thermal strain between the support frame 300 and the auxiliary sheet 500 may be reduced or substantially prevented. Accordingly, the display panel 200 is firmly fixed on the support frame 300 and thus detachment of the display panel 200 from the support frame 300 may be reduced or substantially prevented.

In addition, the alternative exemplary embodiment of FIG. 3 may provide a relatively light-weight and thin display device by omitting the upper frame 100.

Figure 4:
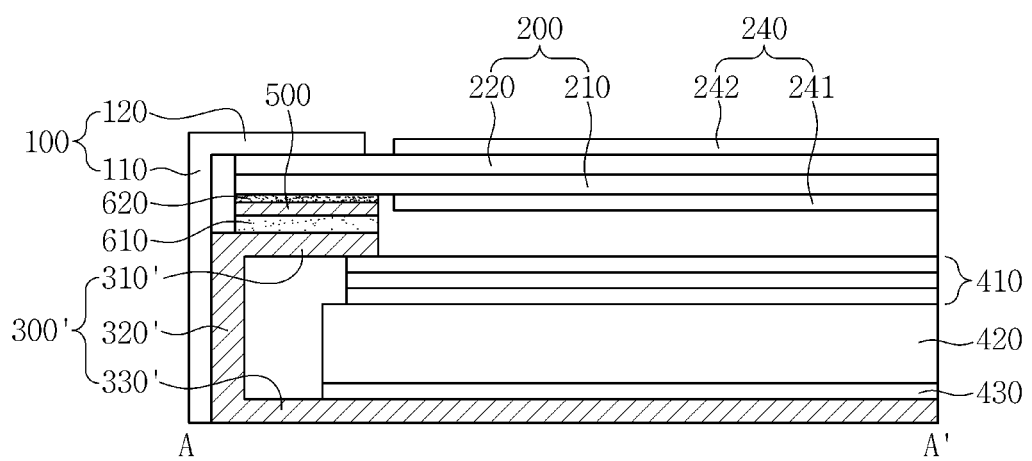
FIG. 4 is a cross-sectional view of still another exemplary embodiment of a display device according to the invention, taken along line A-A' of FIG. 1.

FIG. 4 is a cross-sectional view still another alternative exemplary embodiment of a display device according to the invention, taken along line A-A' of FIG. 1. The display device according to still another alternative exemplary embodiment is substantially the same as the display device according to an exemplary embodiment disclosed in FIGS. 1 and 2 except the structure of a support frame. The descriptions of the same configuration as an exemplary embodiment will be omitted for convenience of explanation.

Referring to FIG. 4, a support frame 300' according to still another alternative exemplary embodiment includes a support portion 310' on which a display panel 200 is supported, a side surface portion 320' which is bent from the support portion 310' and a bottom portion 330' which is bent from the side surface portion 320'. That is, the support frame 300' according to another alternative exemplary embodiment may define a lower frame which supports the display panel 200. The bottom portion 330' may define a lower surface of the overall display device. The support frame 300' may have a "["-shaped cross-section. One of the support portion 310', the side surface portion 320' and the bottom portion 330' may be extended to define the other one of the support portion 310', the side surface portion 320' and the bottom portion 330', such that the support frame 300' is an integral member.

Although not illustrated, a light source unit 450 may be disposed between the bottom portion 330' and the support portion 310'. That is, the light source unit 450 may be disposed in an area surrounded by the support portion 310', the side surface portion 320', the bottom portion 330' and a light incident surface of a light guide plate 420.

While the display device according to one or more exemplary embodiment includes the separate support frame 300 and the separate lower frame 440, the display device according to alternative exemplary embodiments omits the separate lower frame 440 as including only the support frame 300' including the support portion 310', the side surface portion 320' and the bottom portion 330'. With the omission of the separate lower frame 440, one or more exemplary embodiment may provide a relatively light-weight and thin display device.

As set forth hereinabove, according to one or more exemplary embodiments, the auxiliary sheet including a substantially same material as that included in the support frame is provided between the display panel and the support frame to improve the adhesive force between the display panel and the support frame and reduce or substantially prevent the display panel from being detached from the support frame.

While the invention has been illustrated and described with reference to the exemplary embodiments thereof, it will be apparent to those of ordinary skill in the art that various changes in form and detail may be made thereto without departing from the spirit and scope of the invention.

What is claimed is:

1. A display device comprising:
    a display panel which displays an image with light;
    a support frame on which the display panel is supported, the support frame comprising:
        a support portion which supports the display panel thereon, and
        a side surface portion extended bent from the support portion;
    an auxiliary sheet between the display panel and the support portion, the auxiliary sheet fastened to the display panel and to the support frame; and
    a first adhesive member between the auxiliary sheet and the support portion, the first adhesive member attaching the auxiliary sheet to the support portion,
    wherein the auxiliary sheet comprises a same material as a material included in the support frame.

2. The display device as claimed in claim 1, wherein the support frame and the auxiliary sheet comprise at least one selected from magnesium (Mg), aluminum (Al) and alloys thereof.

3. The display device as claimed in claim 1, wherein the first adhesive member between the auxiliary sheet and the support portion is a double-sided tape.

4. The display device as claimed in claim 3, wherein at least one surface of the first adhesive member between the auxiliary sheet and the support portion comprises at least one selected from an acrylic resin, an epoxy resin, a fluoro-resin and a polytetrafluoroethylene resin.

5. The display device as claimed in claim 1, further comprising a second adhesive member between the display panel and the auxiliary sheet, the second adhesive member attaching the display panel to the auxiliary sheet.

6. The display device as claimed in claim 5, wherein the second adhesive member between the display panel and the auxiliary sheet has a greater adhesive force than an adhesive force of the first adhesive member between the auxiliary sheet and the support portion.

7. The display device as claimed in claim 5, wherein
    the first adhesive member between the auxiliary sheet and the support portion has an adhesive force in a range from about 1 kgf/cm$^2$ to about 10 kgf/cm$^2$, and
    the second adhesive member between the display panel and the auxiliary sheet has an adhesive force in a range from about 30 kgf/cm$^2$ to about 500 kgf/cm$^2$.

8. The display device as claimed in claim 5, wherein the second adhesive member between the display panel and the auxiliary sheet comprises at least one selected from an acrylic resin, an epoxy resin, a fluoro-resin and a polytetrafluoroethylene resin.

9. The display device as claimed in claim 1, wherein the side surface portion of the support frame further extends to define a bottom portion of the support frame, the bottom portion extending to be disposed under the display panel.

10. The display device as claimed in claim 9, further comprising:
    a light source which generates and emits the light, the light source disposed between the bottom portion and the support portion of the support frame;
    a light guide plate to which the light source provides the light, the light guide plate emitting the light provided from the light source toward the display panel; and
    an optical sheet between the light guide plate and the display panel.

11. The display device as claimed in claim 1, further comprising a lower frame coupled to the support frame.

12. The display device as claimed in claim 11, further comprising:
    a light source which generates and emits the light, the light source disposed in the lower frame;
    a light guide plate to which the light source provides the light, the light guide plate emitting the light provided from the light source toward the display panel; and
    an optical sheet between the light guide plate and the display panel.

* * * * *